APPARATUS FOR INSPECTION OF TUBULAR FERROMAGNETIC MEMBERS USING PLURAL MOVABLE SEARCH SHOES FOR IDENTIFYING AREA DEPTH AND LOCATION OF DISCONTINUITIES

Filed June 29, 1960 2 Sheets-Sheet 1

INVENTORS
HUBERT A. DEEM
WILLIAM T. WALTERS
FENTON M. WOOD
BY
Tom Arnold
D.C. Roylance
ATTORNEYS Aug. 24, 1965 H. A. DEEM ETAL 3,202,914

APPARATUS FOR INSPECTION OF TUBULAR FERROMAGNETIC MEMBERS USING PLURAL MOVABLE SEARCH SHOES FOR IDENTIFYING AREA DEPTH AND LOCATION OF DISCONTINUITIES

Filed June 29, 1960 2 Sheets-Sheet 2

INVENTORS
HUBERT A. DEEM
WILLIAM T. WALTERS
FENTON M. WOOD

BY

Tom Arnold
D.C. Roylance
ATTORNEYS 3,202,914

APPARATUS FOR INSPECTION OF TUBULAR FERROMAGNETIC MEMBERS USING PLURAL MOVABLE SEARCH SHOES FOR IDENTIFYING AREA DEPTH AND LOCATION OF DISCONTINUITIES

Hubert A. Deem, Bethany, Okla., and William T. Walters and Fenton M. Wood, Houston, Tex., assignors, by mesne assignments, to American Machine & Foundry Company, New York, N.Y., a corporation of New Jersey Filed June 29, 1960, Ser. No. 39,687
4 Claims. (Cl. 324—37)

This invention relates to apparatus for inspecting elongated members and, more particularly, to apparatus for nondestructively inspecting elongated, tubular, ferromagnetic members such as pipe, oil well production tubing and the like.

In many fields of application, tubular members such as pipe are subjected to internal wear and therefore must be inspected periodically to determine their acceptability for continued use. During the inspection of such members, it is highly desirable not only to detect the existence and location of internal wear but also to measure the depth thereof, and conversely the wall thickness of the tubular member, with a relatively high degree of accuracy. Additionally, since these members often contain flaws or defects, such as seams and the like, it is also desirable during inspection to detect the seams.

It is now common to inspect ferromagnetic tubular members by passing magnetic flux through a portion of the member in such fashion that discontinuities in the member, such as are caused by seams, corrosion and the like, distort the magnetic field so that flux leaks from the member. By accomplishing relative movement between a search coil and such leakage flux, an electrical signal is induced, in accordance with the well-known principle of the Faraday law, proportional to the rate of change at which the coil cuts the flux.

Prior-art workers have heretofore proposed various kinds of apparatus, utilizing the principle of the Faraday law, to determine the longitudinal location of flaws or discontinuities in an elongated ferromagnetic member. Typical of such prior-art devices are those disclosed in U.S. Patent 2,553,350, issued May 15, 1951, to Bayhi, and U.S. Patent 2,895,103, issued July 14, 1959, to Vogt et al. While prior-art devices of this type are capable of detecting and even measuring various types of discontinuities, they do not provide for determination of the depth of relatively wide discontinuities, such as wear, for example, exhibited by the member being inspected. Further, such prior-art devices as have been proposed for the depth of discontinuities in ferromagnetic members have been relatively highly complicated and expensive.

It is accordingly a general object of the present invention to provide an improved, simple and economical apparatus which is not only capable of detecting and locating discontinuities, such as wear, in an elongated tubular ferromagnetic member, but also provides an accurate indication of the depth or radial extent of the detected discontinuity.

Another object is to provide such a device capable of inspecting pipe and like tubular ferromagnetic members from the outside for the detection, location and measurement of internal discontinuities. In this connection, the invention is particularly applicable to the external inspection of oil well production tubing for detection of rod wear and measurement of the depth thereof.

While it has heretofore been proposed to employ externally applied apparatus for inspecting ferromagnetic tubular members, the use of such devices has met with considerable practical difficulties. One such difficulty arises because it has been practically impossible to maintain constant concentricity or transverse spacing between the inspecting device and the ferromagnetic member being inspected during relative movement between the inspecting device and the ferromagnetic member. Typically the inspecting device may employ a search coil mounted to be disposed closely adjacent to the outer surface of the ferromagnetic member so as to cut leakage flux resulting from flaws. Since a magnetic flux is continually passed through the ferromagnetic member during inspection, and since relative longitudinal movement between the search coil and the ferromagnetic member is necessary, it is obvious that even small radial shifts of the search coil relative to the member being inspected, will result in an induced signal which gives an erroneous indication so that interpretation of the inspection is made difficult, if not impossible.

Note further this: If the member being inspected shifts off-center in a direction perpendicular to a line connecting the two search shoes in FIGURE 2, then a relative movement between search coil and member occurs, and a noise signal is thereby induced which may be of greater significance even than a noise signal induced by radial movement of the search coil relative to the pipe. It is accordingly another object of the invention to provide apparatus wherein erroneous indications resulting from off-center shift of the pipe, and from radial and from circumferential shifting of the search coil relative to the member being inspected, are eliminated.

In detecting and measuring internal discontinuities in a tubular ferromagnetic member in accordance with the invention, a magnetic field is established transversely of the tubular member, so that leakage flux occurs at the outer surface of the tubular member when internal wear is encountered, the configuration of the leakage flux depending not only upon the depth of wear but also upon the width thereof. Yet another object of the invention is to provide an apparatus employing search coil means responsive to such leakage flux and wherein an indication is derived which, for practical purposes, depends upon the depth, but not the width, of the internal wear causing the leakage flux.

As has been stated, the invention finds particular application in the inspection of oil well production tubing for rod wear. Such tubing frequently contains other types of discontinuities than rod wear. It is accordingly a still further object of the invention to devise an apparatus capable not only of detecting and measuring rod wear in production tubing but also of concurrently detecting other types of defects, particularly longitudinal seams.

In order that the manner in which these and other objects are attained, in accordance with the invention, can be understood in detail, reference is had to the accompanying drawings, which form a part of this specification, and wherein.

Figure 1:
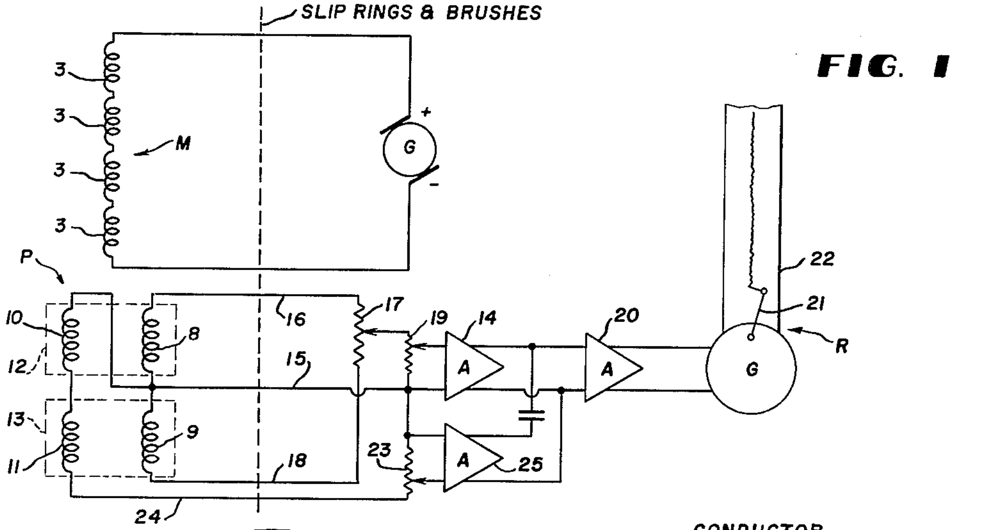
FIG. 1 is a schematic diagram of the electrical components of an apparatus constructed in accordance with one embodiment of the invention.

Referring now to the drawings in detail, the embodiment of the invention chosen for illustration is an apparatus especially adapted for detecting and measuring rod wear in oil well production tubing, the apparatus also being capable of detecting other types of discontinuities, such as longitudinal seams, in the tubing. The apparatus comprises magnetizing means M, for establishing a magnetic field transversely of the tubing 1 to be inspected, pickup means P for producing output signals when discontinuities in the tubing are encountered, driving means D for producing relative motion between the tubing, on the one hand, and the pickup means and magnetizing means, on the other hand, so that the pickup means scans the tubing, and indicating or recording means R responsive to signals from the pickup means.

Figure 2:
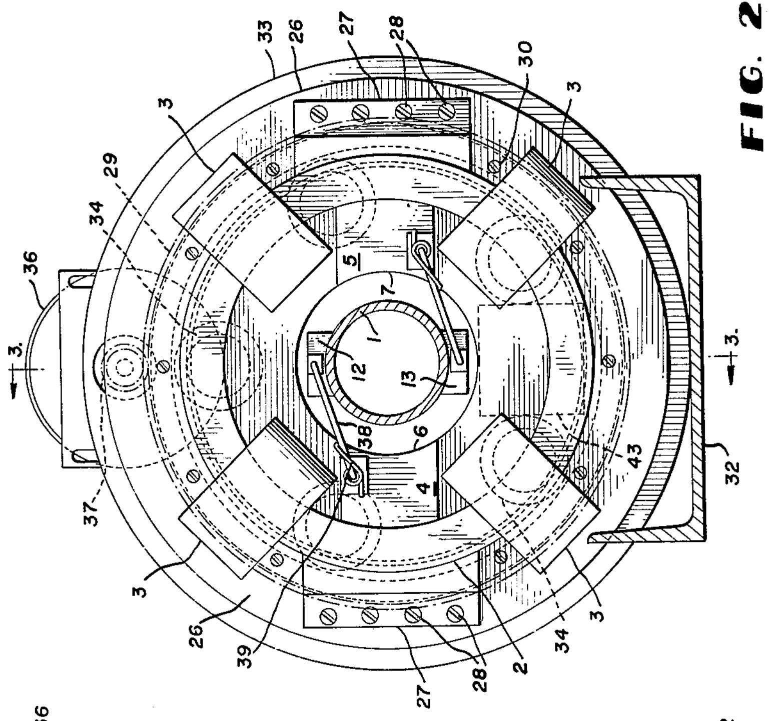
FIG. 2 is an end elevational view of said apparatus.

As best seen in FIG. 2, magnetizing means M comprises an annular core 2 of magnetic material, for energizing coils 3 and a pair of pole pieces 4 and 5. In this embodiment, the core 2 is circular, has a rectangular transverse cross-section and is of substantially larger diameter than the work piece 1 to be inspected. The energizing coils 3 are each wound upon and fixed to core 2, the coils being spaced equiangularly along the circle defined by the core. Pole pieces 4 and 5 are fixed rigidly to the inner face of the core and project inwardly, in opposition, being centered on a common diameter of the circle defined by the core. The pole faces 6 and 7, respectively, of pole pieces 4 and 5 are arcuate and define portions of a cylindrical surface concentric with the core 2. Thus, the centers of curvature of the pole faces and the core coincide. As will be clear from FIG. 1, coils 3 are connected in series to a source of direct current so that, when the coils are energized, a unidirectional magnetic field extends between the pole faces of pole pieces 4 and 5.

Figure 4:
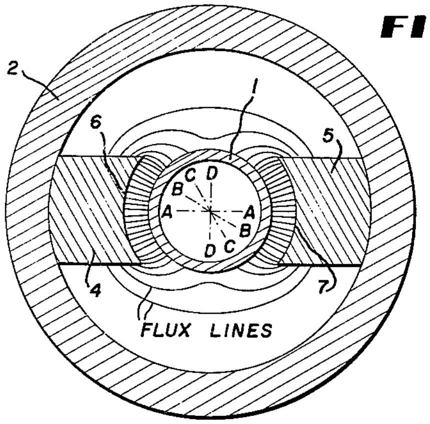
FIG. 4 is a diagrammatic view, taken transversely of the tubular member to be inspected, illustrating the magnetic flux distribution between the apparatus and the tubular member.

The primary purpose of the magnetizing means is to create a magnetic field extending substantially transversely, and therefore substantially diametrically, with respect to the tubular work piece 1. Assuming that a direct current of substantially constant value is passed through the series combination of the energizing coils 3, the resulting magnetic field will be transverse to the tubular member 1 along the diameter D—D, FIG. 4. In a typical installation utilizing a total of 660 turns in the magnetizing coils and energized by 12.5 amp. D.C., the flux density at points A, FIG. 4, is approximately 2.5 kilogauss, 1.4 kilogauss at points B, 0.35 kilogauss at points C and 0 at points D. Thus, at points D, defining a diametrical line at right angles to common axis of the pole pieces, the flux density is at a minimum and the magnetic field is disposed substantially diametricially with respect to the tubular member 1.

The pickup means P comprises a first pair of search coils 8 and 9, FIG. 1, employed to respond to leakage flux resulting from internal rod wear exhibited by tubular member 1, the coils 8 and 9 hereinafter being referred to as the rod wear search coils. Pickup means P also includes a second pair of coils 10 and 11, FIG. 1, employed to respond to leakage flux resulting because of other discontinuities, and particularly seams, in tubular member 1, the coils 10 and 11 being hereinafter referred to as the seam search coils. As will be later explained in detail, coils 8 and 10 are carried by a single search shoe 12, while coils 9 and 11 are carried by a second search shoe 13. All of the search coils are so disposed that, when the apparatus is in use during inspection of tubular member 1, the turns of the search coils extend closely adjacent to and along the outer surface of the tubular member.

The rod wear search coils 8, 9 are connected in parallel to the input terminals of an amplifier hereinafter described in detail, indicated at 14, FIG. 1. Thus, one terminal of each coil 8 and 9 is connected to the common conductor 15 leading to one input terminal of amplifier 14. The remaining terminal of coil 8 is connected via conductor 16 to one end of a balance control potentiometer 17, the remaining terminal of coil 9 being connected to the other end of potentiometer 17 via conductor 18. The slider of the potentiometer is connected to one end of a gain control potentiometer 19, the slider of which is connected to the remaining input terminal of amplifier 14, the other end of potentiometer being connected to conductor 15.

The output of amplifier 14 is supplied to a power amplifier 20 and the amplifier signal is in turn supplied to suitable indicating or recording means shown at R, FIG. 1, and in this embodiment, consisting of a galvanometer recorder comprising a marking element 21 arranged to provide a log or graph on a record tape 22 driven in timed relation with the scanning of tubular member 1.

Seam search coils 10 and 11 are connected in series across a gain control potentiometer 23 via conductors 15 and 24. The slider of potentiometer 23 is connected to one input terminal of a signal amplifier 25, the other input terminal thereof being connected between potentiometer 23 and conductor 15. The output of signal amplifier 25 is capacitively coupled to the input of power amplifier 20, as shown in FIG. 1, so that the signals from both amplifiers 14 and 25 are combined, amplifier by the power amplifier, and fed to the galvanometer recorder.

Figure 3:
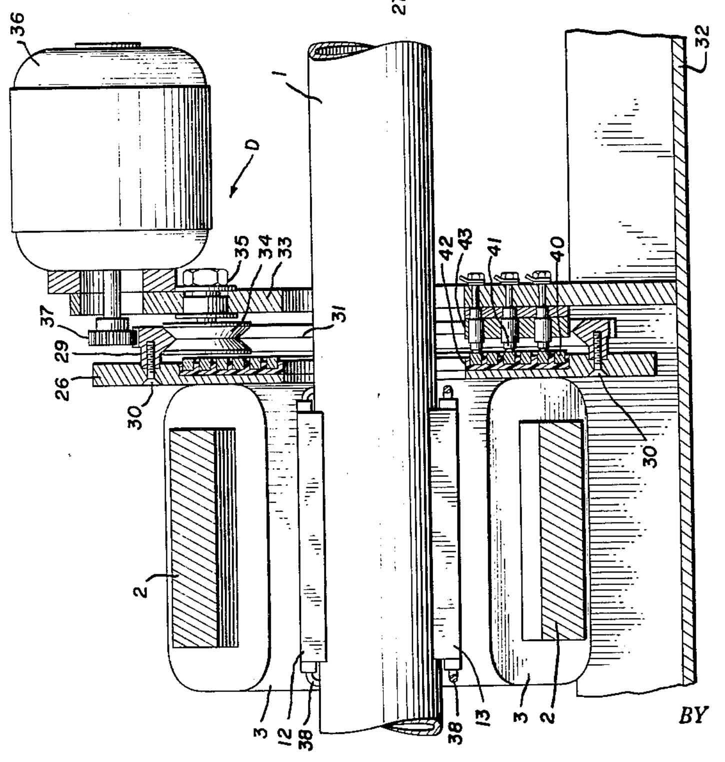
FIG. 3 is a longitudinal vertical sectional view taken on line 3—3, FIG. 2, with some parts shown in elevation.

Referring now to FIGS. 2 and 3, it will be seen that the magnetic core 2 is mounted rigidly on an annular supporting plate 26 by means of a pair of non-magnetic mounting blocks 27, FIG. 2, the core being fixed to the mounting blocks in any suitable fashion and the mounting blocks being secured to plate 26 by means of screws 28. A ring gear 29 is rigidly attached to the side of plate 26 opposite core 2, as by screws 30, gear 29 having external teeth and a bevelled circular inner edge 31, FIG. 3. The apparatus is supported by a rigid, horizontally extending base structure 32 on which is mounted, in upright position, an annular frame plate 33. A circularly spaced series of rollers 34 are carried by frame plate 33, the rollers 34 being identical and each having a grooved periphery in which the tapered inner edge 31 of ring gear 29 is engaged. The shaft of each roller 34 is fixed to frame plate 33 by any suitable mounting means, as by the nut, washer and flange arrangement seen at 35, FIG. 3, all of the rollers 34 of course being mounted for free rotation on their shafts. It is thus apparent that the magnetic core 2, and all elements carried thereby, are supported, via frame plate 33, rollers 34, ring gear 29 and plate 26, for free rotation about the axis of the core.

Also mounted on frame plate 33 is an electric driving motor 36 having secured to tis output shaft a pinion 37 operatively meshed with the teeth of ring gear 29. Thus, operation of the motor is effective to continuously rotate core 2, and therefore the entire magnetizing means M, about the central axis of the core.

Supporting plate 26 and frame plate 33 have aligned openings adequate in size to allow free passage of the tubular member 1 to be inspected, such openings being concentric with the central axis of core 2. It is thus obvious that the tubular member 1 can readily be inserted in the apparatus and passed axially therethrough while motor 36 is operated to rotate core 2 and its associated elements.

Search shoe 12 is mounted on pole piece 4 in such fashion as to be resiliently urged into contact with the surface of the tubular member 1 at a point corresponding to one end of the diametrical line D—D, FIG. 4. Search shoe 13 is mounted on pole piece 5 in such fashion as to be resiliently urged into contact with the surface of tubular member 1 at a point corresponding to the other end of the diametrical line D—D, FIG. 4. The mounting means for each search shoe are identical and only one will be described in detail. Thus, the mounting means for search shoe 12 comprises two substantially rigid arms 38, each pivoted at one end to a different side of pole piece 4 and at the other end to a different end of search shoe 12. A torsion spring 39 has one end fixed with respect to pole piece 4 and the other end engaged with one of the arms 38 in such fashion as to urge that arm, and therefore the search shoe 12, toward the tubular member 1 being inspected. The search shoes are formed with concave faces to be directed toward tubular member 1, such faces having the same curvature as the outer surface of the tubular member. The torsion springs 39 are thus effective to bias the search shoes into flush engagement with the outer surface of tubular member 1.

Though resiliently biased by the torsion springs 39, the arms 38 support the search shoes with sufficient rigidity to assure positive rotation of the search shoes with the core 2 and to minimize, and preferably eliminate, relative movement between the search shoes, on the one hand, and the pole pieces 4 and 5, on the other hand. Since relative movement between the search shoes and the pole faces tends to produce highly undesirable noise signals, the effect of the mounting means comprising arms 38 and springs 39 in at least greatly minimizing such relative movement is clearly advantageous.

In order that complete inspection of the tubular member 1 can be accomplished, and since rotation of the magnetizing means and search coils is in a plane at right angles to the longitudinal axis of the tubular member, the tubular member is moved axially through the apparatus, in continuous fashion, while drive motor 36 is in operation. In this way, the search coils are caused to scan the tubular member helically, so that the entire wall of the tubular member is inspected.

In order that the apparatus can be made simple and relatively inexpensive, it is desirable that electrical components thereof other than the magnetizing means and the search shoe be mounted as stationary equipment not carried by the rotating assembly. Accordingly, connection of the magnetizing coils 3 and the search coils 8–11 to their associated electrical circuits is accomplished via a plurality of concentric slip rings 40 and cooperating brushes 41 in the manner seen in FIG. 3. Slip rings 40 are imbedded in an annular plate 42 of electrical insulating material, the plate 42 being rigidly secured to supporting plate 26 on the side thereof adjacent to frame plate 33. The frame plate 33 carries a brush-holding block 43, the brushes 41 being mounted in the block in usual fashion so as to bear against appropriate ones of the slip rings, so completing the necessary electrical connections to the elements carried by the rotary assembly.

Figure 6:
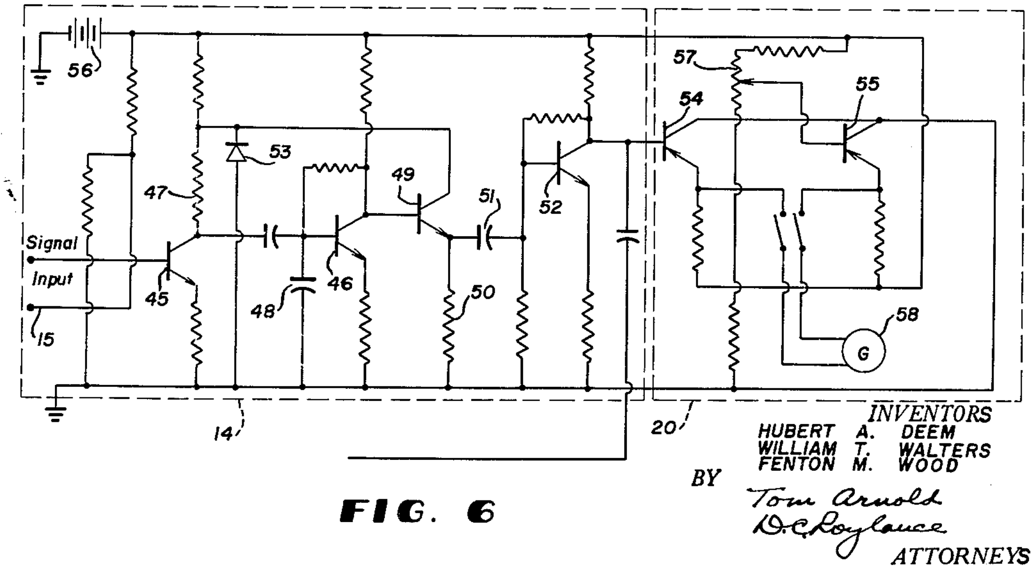
FIG. 6 is a schematic diagram of integrating and amplifying means employed in the apparatus of FIGS. 1–3.

Before considering overall operation of the apparatus just described, the detailed nature of amplifier 14 must be considered, this amplifier being shown in FIG. 6. Signals from the rod wear search coils 8 and 9, being of low level and low frequency, are supplied to the base of an NPN transistor 45 employed for low noise first stage amplification. The output of transistor 45 is supplied to the base of a second NPN transistor 46 via an integrating network comprising resistance 47, capacitor 48 and the base input resistance of transistor 46. The circuit parameters of the integrating network are so selected that the output voltage, supplied to transistor 46, is the integral of the input voltage to the network over a predetermined frequency range. Further, the integrating network is designed with a time constant sufficiently high to assure that the output supplied to transistor 46 is indicative of the total flux cut by the rod wear search coils and not of the rate of the flux. In other words, the integrating network is made effective to remove from those signals derived from the rod wear search coils 8 and 9 components or factors proportional to the width of the discontinuity causing the signal. The integrating signal supplied to transistor 46 is thus proportional only to the depth or radial extent of the discontinuity detected.

A Zener diode 53 is connected between ground and the collectors of transistors 45 and 46 to provide regulation of the voltage supplied to the collector of transistor 45.

Having been amplified by transistor 46, the signals are supplied via direct coupling to the base of a NPN transistor 49 for further amplification. Amplified by transistor 49, the signals are then fed, via a RC coupling including resistance 50 and capacitor 51, to the base of NPN transistor 52, the latter transistor accomplishing further amplification of the signals.

The output of integrating amplifier 14 is taken from the collector of transistor 52 and supplied to the input of power amplifier 20, the latter comprising two PNP transistors 54 and 55, FIG. 6, transistors 54 and 55 being connected in parallel to supply a common meter load through a circuit of emitter-follower configuration. The signal from amplifier 14 is supplied directly to the base of transistor 54. The base of transistor 55, on the other hand, is supplied with an adjustable D.C. voltage derived from direct current source 56 via potentiometer 57. The purpose of transistor 55 is to furnish low impedance centering current to the galvanometer load 58. Thus, the galvanometer 58 can be zero adjusted at any desired level by adjusting potentiometer 57 until the current through the load resistance of transistor 55 produces a voltage drop equal to the voltage drop across the load resistance of transistor 54.

Amplifier 25, FIG. 1, to which signals from seam search coils 10 and 11 are applied, is constructed in identical fashion with amplifier 14, save that the intergrating capacitor 48 is omitted and the time constants of the RC coupling between transistors 49 and 52 are greatly reduced to values on the order of a fraction of a second. Thus, the values of resistance 50 and capacitor 51 are chosen so that the high frequencies of the signals from the seam search coils pass without distortion. The output of amplifier 25 is capacitively coupled to the input of power amplifier 20, as will be clear from FIGS. 1 and 6, so that the rod wear signals from coils 8 and 9 and the seam signals from coils 10 and 11 are combined and supplied, via the power amplifier, to the galvanometer 58.

Figure 5:
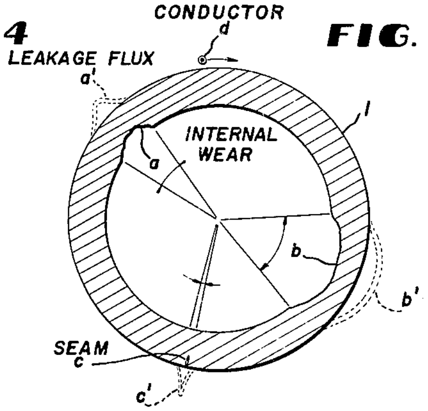
FIG. 5 is a transverse sectional view through a piece of pipe, illustrating various types of discontinuities which are detected in accordance with the invention.

Referring now to FIG. 5, various types of discontinuities which can be detected by the apparatus above described are illustrated. Thus, the tubing 1 to be inspected is shown as exhibiting relatively narrow internal wear, as at *a*, relatively wide internal wear, as at *b*, and a longitudinally extending seam indicated at *c*. In this particular example, the angle subtended by the internal wear at *a* is shown as approximately half the angle subtended by the broader internal wear at *b*, the depth of internal wear in each case being substantially the same. Because of the increased reluctance at the points of internal wear *a* and *b* and at the location of the seam *c*, a small amount of the flux passing through the wall of tubing 1, when the same is subjected to the magnetic field extending between pole pieces 4 and 5 as hereinbefore explained, will leak from the outer surface of the tubing at points *a'*, *b'* and *c'* immediately outward of the outer surface of the tubing, as indicated by the broken lines in FIG. 5. The search coils 8–11 can be considered as presenting conductors each disposed in the general fashion indicated at *d*, FIG. 5, each such conductor of course being rotated as indicated by the arrow in FIG. 5 when drive motor 36 is operated. When the conductor passes through the leakage flux at a constant rate, the rate of change of flux will be twice as great as the conductor passes through the leakage flux at *a'* as it will when the conductor passes through the leakage flux at *b'*. In accordance with the Faraday law of electromagnetic induction, the resultant induced signal in the conductor will be twice as great in the case of leakage flux at *a'* as in the case of leakage flux at *b'*, though the two areas of internal wear at points *a* and *b* which cause such leakage flux have the same depth.

Since the invention is concerned with determining, by means of the signals derived from rod wear search coils 8 and 9, the depth of the internal wear, rather than the mere existence thereof, it is important that the components of the induced signals from the rod wear search coils which are proportional to the widths of the leakage flux areas be removed. In this regard, it will be understood that, in accordance with the invention, no attempt is made to accomplish such removal prior to the time the induced signals from rod wear search coils 8 and 9 are amplified by transistor 45. Subsequent to such amplification, however, the integrating network comprising resistance 47 and capacitor 48 is effective, in the manner hereinbefore described, to remove from the signal that component proportional to the width of the leakage flux area.

Referring again to FIG. 5, it will be seen that a seam, such as indicated at *c*, subtends an angle which is very small as compared to the angles subtended by the internal wear at *a* and *b*. Consequently, the leakage flux at *c'* is confined to a very small area so that, when conductor *d* passes therethrough, a signal is induced in the conductor which, while of substantial magnitude, is in the nature of a pulse of very short duration. Were such a seam signal to be supplied to the integrating amplifier 14 and therefore highly attenuated, as is done in the case of rod wear signals, the high attenuation would render the seam signal undetectable at the output of the amplifier. Accordingly, the invention employs the separate seam search coils 10 and 11, signals from which are fed to the amplifier 25 and therefore not subjected to such attenuation. Because of the distinctively different nature of the two types of signals supplied from amplifiers 14 and 25, the signals can all be combined and indicated or recorded by a single device, such as the galvanometer recorder indicated at R in FIG. 1.

Figure 7:
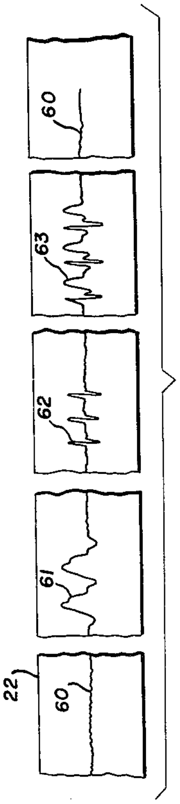
FIG. 7 illustrates a typical recorded log produced by said apparatus.

FIG. 7 indicates a typical log which may result from operation of the apparatus hereinbefore described to inspect a piece of oil well production tubing. It will be understood that a conventional galvanometer recorder can be employed in such fashion that the record tape 22 is moved at a rate proportional to the speed at which the tubing is scanned, so that any mark recorded on the tape can be correlated directly to the location of that portion of the tubing which was scanned to produce the mark. Assuming that an area of the tubing being scanned contains no discontinuities, a relatively uniform record line, typically indicated at 60, will be made on the tape. When, during scanning of the tubing, an area of internal wear, such as is indicated at *a* and *b* in FIG. 5, is encountered, the resulting induced signals from the rod wear search coils 8 and 9, having been integrated and amplified by amplifiers 14 and 20 as explained, will produce a record pattern typically indicated at 61. When a seam, as indicated at *c*, FIG. 5, is encountered during scanning, without internal wear also being present, the resulting signal derived from seam search coils 10 and 11 and amplified by amplifiers 25 and 20 will result in a record pattern typically illustrated at 62. When both internal wear and a longitudinal seam are encountered at the same time during scanning, the two signals derived respectively from coils 8 and 9, on the one hand, and coils 10 and 11 on the other, being combined in the output from amplifier 20, produce a pattern typically illustrated at 63. It will be obvious that such record patterns can be interpreted easily, without requiring unusual skill, by anyone familiar with the operation of the apparatus.

In considering the mode of operation of the apparatus, is will be noted that perfect concentricity of core 2, pole faces 6 and 7, the arcuate faces of search shoes 12 and 13 and tubing 1 is theoretically desirable throughout operation of the apparatus to scan tubing 1. If such concentrictiy is not maintained, thre is a marked tendency for an erroneous signal to be induced in the search coils, so that the record log or other indication obtained as a result of operation of the device might not be meaningful. To avoid this difficulty without requiring maintenance of absolute concentricity, the rod wear search coils 8 and 9 are connected in parallel so that a positive induced voltage in one cancels a like negative induced voltage in the other. Since undesired signals which would be induced in the rod wear search coils by a shift from the true concentricity just mentioned would result from just such induced voltages, it is clear that the parallel connection of the rod wear search coils is effective to eliminate this problem. On the other hand, noting that the two rod wear search coils 8 and 9 are located at different points spaced diametrically across the tubing 1, it will be obvious that leakage flux resulting because of internal wear exhibited by the tubing will not affect both rod wear search coils at once, there therefore being no cancellation of the rod wear signals by reason of the manner in which the rod wear search coils are connected in the circuit.

It is to be understood that, while one specific type of integrating amplifier has been described which is suitable and advantageous for use as the amplifier 14, this amplifier can take any of a variety of known forms so long as it includes means for yielding an output which is indicative of the total flux from an input which is indicative of the time rate of change of the flux, and provided further that is possesses suitable low noise charcteristics. Thus, for example, any of the conventional ampliers employing an integrating feedback capacitor, such as are commonly employed in analog computers, can be used as amplifier 14.

In the particular embodiment illustrated, the magnetic core 2 and the components carried thereby are mounted for simple circular motion about the axis along which the tubular member to be inspected is passed, so that operation of the motor 36 alone is effective to cause the search coils to scan one circular transverse segment of the work, helical scanning being accomplished by the additional step of axially feeding the tubular member while motor 36 is in operation. As is well known in this art, the relative movement between the tubular member 1, on the one hand, and the search coils and magnetizing means, on the other hand, necessary to accomplish helical scanning can be provided in other ways. Thus, the combination of the magnetizing means and search coils can be caused to both rotate about and travel axially along the tubular member being inspected, the tubular member being held stationary in that event. Conversely, it is possible to hold the scanning means stationary and to simultaneously rotate and axially feed the tubular member being scanned.

It will be understood by those skilled in the art that various changes and modifications in the embodiment of the invention chosen for illustration can be made without departing from the scope of the invention as defined by the appended claims.

What is claimed is:

1. In a multi-purpose apparatus for non-destructive inspection of oil well production tubing to accomplish (1) detection and measurement of the depth of rod wear and (2) detection of longitudinal seams and like discontinuities, the combination of an assembly constructed to surround the tubing to be inspected, said assembly comprising magnetic means for establishing a magnetic field extending transversely through the wall of the tubing, rod wear causing relatively broad areas of leakage flux to appear at the outer surface of the tubing, seams and like discontinuities causing relatively narrow areas of leakage flux to appear at the outer surface of the tubing, said broad and narrow areas subtending approximately the same angles subtended by said rod wear and said seams and like discontinuities, said assembly further comprising a pair of search shoes each carrying a rod wear search coil and a seam search coil, said shoes being mounted on said assembly in such fashion as to be disposed in opposition transversely across the tubing when said assembly surrounds the tubing; a first electrical circuit including said rod wear search coils, said first circuit comprising electrical integrating means operative to convert signals induced in said rod wear search coils, by passage through such broad areas of leakage flux, into output signals indicative of total flux rather than rate of change of flux, said integrating means having a time constant at least sufficiently long to equal the time of said passage; a second electrical circuit including said seam search coils, said second electrical circuit being operative to provide output signals in response to signals induced in said seam search coils by passage through such narrow areas of leakage flux; electro-responsive means connected to said circuits to respond to said output signals, and means for effecting relative rotation, between said assembly and the tubing, about the axis of the tubing.

2. Apparatus in accordance with claim 1 and wherein said rod wear search coils are connected in said first circuit in parallel in such manner that positive induced voltages in one thereof oppose negatively induced voltages in the other thereof.

3. Apparatus in accordance with claim 1 and wherein said electro-responsive means comprises a single device connected to respond to output signals from both of said circuits.

4. In a multi-purpose apparatus for non-destructive inspection of oil well production tubing to accomplish (1) detection and measurement of the depth of rod wear and (2) detection of longitudinal seams and like discontinuities, the combination of an assembly constructed to surround the tubing to be inspected, said assembly comprising magnetic means for establishing a magnetic field extending transversely through the wall of the tubing, rod wear causing relatively broad areas of leakage flux to appear at the outer surface of the tubing, seams and like discontinuities causing relatively narrow areas of leakage flux to appear at the outer surface of the tubing, said broad and narrow areas subtending approximately the same angles subtended by said rod wear and said seams and like discontinuities, said assembly further comprising a pair of search shoes each carrying a rod wear search coil and a seam search coil, said shoes being mounted on said assembly in such fashion as to be disposed in opposition transversely across the tubing when said assembly surrounds the tubing; an integrating amplifier circuit operatively connected to receive signals induced in said rod wear search coils by passage through such broad areas of leakage flux, said circuit having a time constant at least sufficiently long to equal the time of said passage, said amplifying circuit providing output signals indicative of the total flux, rather than the rate of change of flux, of such broad areas; an amplifier circuit operatively connected to receive signals induced in said seam search coils by passage thereof through such narrow areas of leakage flux; a power amplifier having its input operatively connected to both the output of said integrating amplifier and said amplifier, a single electro-responsive device connected to the output of said power amplifier, and means for effecting relative rotation, between said assembly and the tubing, about the axis of the tubing.

References Cited by the Examiner

UNITED STATES PATENTS

| | | | |
|---|---|---|---|
| 2,467,306 | 4/49 | Habig | 324—40 |
| 2,878,447 | 3/59 | Price et al. | 324—37 |
| 2,889,513 | 6/59 | Callan et al. | 324—37 |
| 2,925,552 | 2/60 | Cowan et al. | 324—37 |
| 2,995,701 | 8/61 | Lloyd | 324—37 |
| 3,056,081 | 9/62 | Hochschild | 324—37 |

FOREIGN PATENTS

| | | |
|---|---|---|
| 1,147,822 | 6/57 | France. |
| 573,152 | 11/45 | Great Britain. |

WALTER L. CARLSON, *Primary Examiner.*

LLOYD McCOLLUM, FREDERICK M. STRADER, *Examiners.*

UNITED STATES PATENT OFFICE
CERTIFICATE OF CORRECTION

'atent No. 3,202,914 August 24, 1965

Hubert A. Deem et al.

It is hereby certified that error appears in the above numbered pat-
nt requiring correction and that the said Letters Patent should read as
orrected below.

In the heading to the drawings, Sheets 1 and 2, line 3, nd in the heading to the printed specification, line 5, after AREA", each occurrence, insert a comma; column 3, lines 56 nd 57, for "diametricially" read -- diametrically --; column 4, ine 15, for "amplifier", second occurrence, read -- amplified -; line 31, for "amplifier", first occurrence, read -- ampli- ied --; line 57, for "tis" read -- its --; column 6, line 1, or "integrating" read -- integrated --; column 7, lines 74 and 5, for "concentrictiy" read -- concentricity --; line 75, for thre" read -- there --; column 8, line 28, for "is" read -- it -.

Signed and sealed this 15th day of March 1966.

\L)

st:

[EST W. SWIDER
;ting Officer

EDWARD J. BRENNER
Commissioner of Patents